US010272964B2

(12) United States Patent
Buchanan

(10) Patent No.: US 10,272,964 B2
(45) Date of Patent: Apr. 30, 2019

(54) ARTICLE MOUNT

(71) Applicant: Chad M. Buchanan, Mequon, WI (US)

(72) Inventor: Chad M. Buchanan, Mequon, WI (US)

(*) Notice: Subject to any disclaimer, the term of this patent is extended or adjusted under 35 U.S.C. 154(b) by 98 days.

(21) Appl. No.: 15/264,571

(22) Filed: Sep. 13, 2016

(65) Prior Publication Data

US 2018/0072362 A1 Mar. 15, 2018

(51) Int. Cl.
*B62J 11/00* (2006.01)
(52) U.S. Cl.
CPC ..................... *B62J 11/00* (2013.01)
(58) Field of Classification Search
CPC ........................................................ B62J 11/00
USPC ................................................ 224/420, 455
See application file for complete search history.

(56) References Cited

U.S. PATENT DOCUMENTS

| | | | | | |
|---|---|---|---|---|---|
| 3,286,892 | A | * | 11/1966 | Marshall | B60R 9/08 224/317 |
| 4,450,989 | A | * | 5/1984 | Bogar, Jr. | A47B 81/005 211/64 |
| 5,078,279 | A | * | 1/1992 | Hancock | A47B 81/005 211/64 |
| 5,344,032 | A | * | 9/1994 | Ramsdell | A47B 81/005 211/64 |
| 6,929,223 | B2 | * | 8/2005 | Hancock | B60R 11/00 211/64 |
| 2003/0042282 | A1 | * | 3/2003 | Gates | A47B 81/005 224/560 |
| 2003/0168484 | A1 | * | 9/2003 | Gates | A47B 81/005 224/401 |
| 2003/0218112 | A1 | * | 11/2003 | Gates | A01K 97/10 248/316.1 |
| 2004/0020954 | A1 | * | 2/2004 | Gates | B60R 9/048 224/442 |
| 2005/0045681 | A1 | * | 3/2005 | Hancock | B60R 11/0205 224/401 |

OTHER PUBLICATIONS

Google images: https://www.google.com/search?q=bicycle+mount&biw=1920&bih=886&tbm=isch&tbo=u&source=univ&sa=X&ved=0ahUKEwihtZ3on4vPAhVEWh4KHWjbBF8QsAQIUw#tbm=isch&q=bicycle+article+mount (Sep. 12, 2016).

* cited by examiner

*Primary Examiner* — Peter N Helvey
(74) *Attorney, Agent, or Firm* — Rathe Lindenbaum LLP

(57) ABSTRACT

An article mount may include a platform, an elastic line extending from the platform and a hook extending from the platform to receive the elastic line to capture at least one article between the elastic line and the article contacting face. The article mount may further include a retainer to releasably secure the article mount to a carrier, such as a bicycle.

20 Claims, 10 Drawing Sheets

ARTICLE MOUNT

BACKGROUND

Bicycles are a popular form of transportation. Unfortunately, carrying or transporting articles on most bicycles is often difficult. Existing devices for mounting articles to a bicycle may be difficult to secure to the bike, may be difficult to secure to the article being held or may be limited for use with just specific articles.

DETAILED DESCRIPTION OF EXAMPLES

Figure 1:
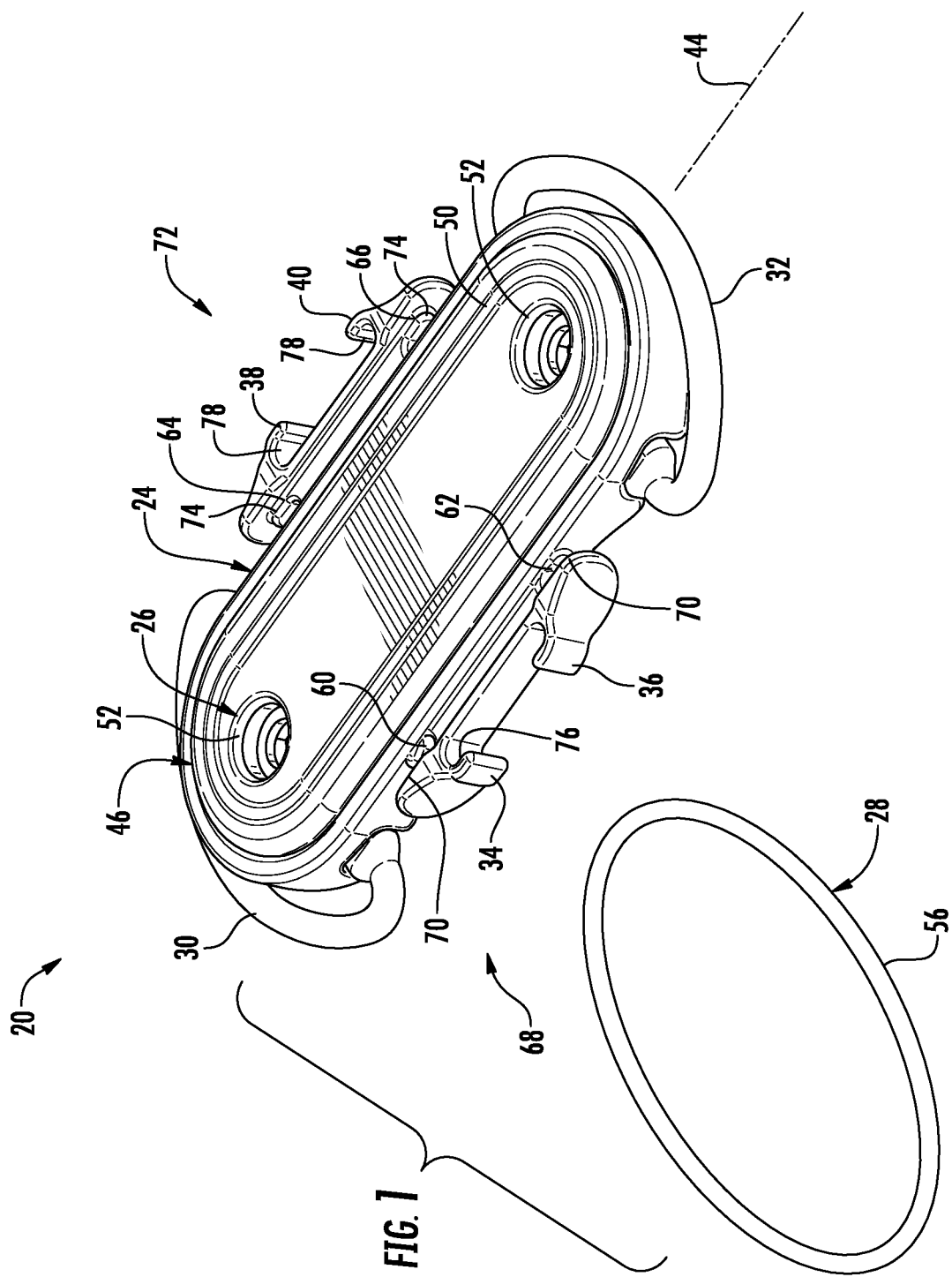
FIG. 1 is a top perspective view of an example article mount.

FIGS. 1-4 illustrate an example article mount 20 for releasably securing articles to a carrier, such as a bicycle. For purposes of this disclosure, the term "releasably" or "removably" with respect to an attachment or coupling of two structures means that the two structures may be repeatedly connected and disconnected to and from one another without material damage to either of the two structures or their functioning. Although the disclosure illustrates and describes the article mount 20 in the context of use with a bicycle to secure articles to the bicycle, it should be appreciated that mount 20 may be utilized with other carriers as well.

As will be described hereafter, bicycle article mount 26 secures articles to a bicycle in an intuitive and easy-to-use fashion. Moreover, bicycle article mount 26 may be secured to the bicycle with little difficulty and is not limited to specific articles. Bicycle article mount 20 is comprised of relatively few parts and may be manufactured at low cost. Bicycle article mount 20 comprises platform 24, retainers 26, 28, elastic lines 30, 32, and hooks 34, 36, 38 and 40.

Platform 24 comprises a rigid base upon which articles are secured. Platform 24 has a major dimension or axial length extending along axis 44. Platform 44 has an article contacting face 46 (shown in FIGS. 1, 3 and 4) and a bicycle contacting face 48 (shown in FIGS. 2, 3 and 4). In the example illustrated, article contacting face 46 has an upper surface that is soft or resiliently compressible, such as a rubber-like material to provide a surface having a high coefficient of friction with the article being held and to contact the article being held without producing noise or damaging the article being held as the bicycle is being written. In the example illustrated, article contacting face 46 is substantially flat or planar having a series of projecting ribs 50 which resist further sliding movement of the article being held. In other implementations, article contact face 46 may have dimples or other article gripping surface textures. In other implementations article contact face 46 may additionally or alternatively be curved to at least partially receive an article being held.

In one implementation, the article contacting face 46 of platform 24 has a an axial length of at least 2 inches and no greater than 10 inches, allowing platform 24 to be reliably secured to a variety of differently sized articles, while the same time, not so large so as to restrict the securement of platform 24 to various portions of the bicycle. In one implementation, platform 24 has an axial length of at least 3.5 inches and no greater than 6 inches. In one implementation, article contacting face 46 of platform 24 has a transverse or lateral with of between 0.5 inches and 3 inches, allowing platform 24 to provide sufficient surface area for contacting, supporting and gripping an article being held, while the same time, not so wide so as to undesirably project from the bicycle tube or other structure by distance where platform 24 may interfere with use of the bicycle or not so wide so as to restrict to which portions of a bicycle that platform 24 may be secured. In one implementation, platform 24 has a length of 3.75 inches and a width of approximately 2 inches.

Figure 3:
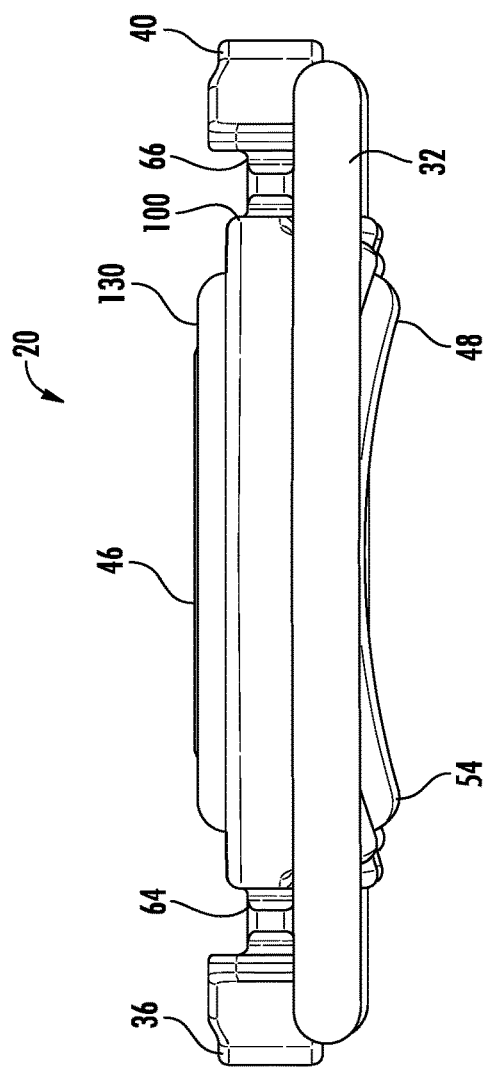
FIG. 3 is an end view of the example article mount.
Figure 4:
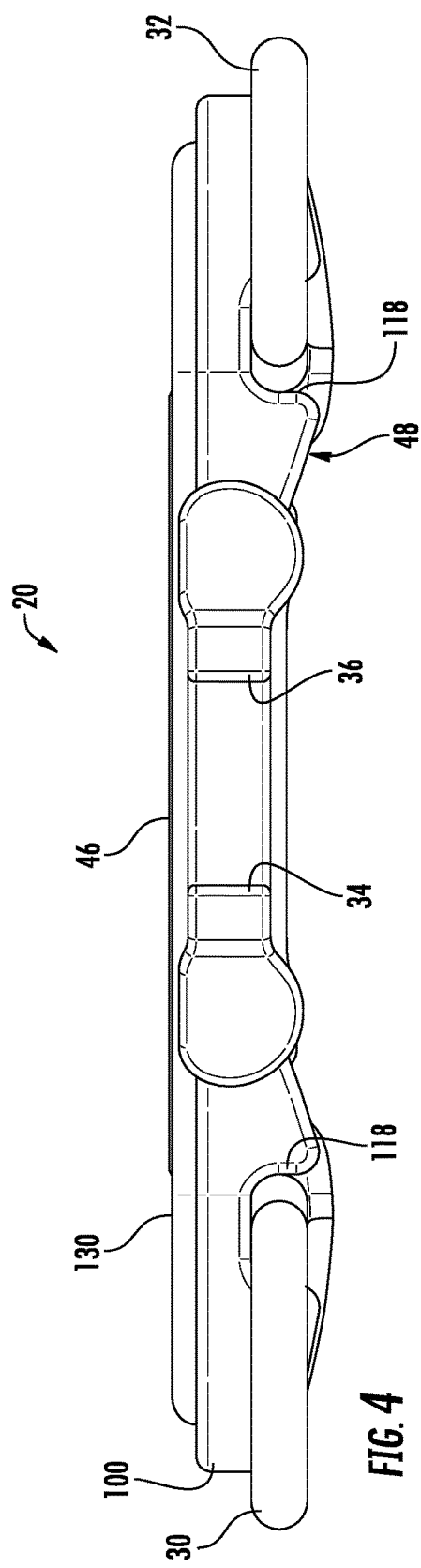
FIG. 4 is a side view of the example article mount.

As shown by FIG. 3, bicycle contacting face 48 faces in a direction opposite to that of article contacting face 46. In the example illustrated, bicycle contacting face 48 is concave, allowing bicycle contacting face 48 to at least partially wrap about a tubular structure of a bicycle. In the example illustrated, those surfaces of bicycle contacting face 48 which are to contact the bicycle are formed from a soft and/or resiliently compressible or deformable material such as a rubber-like material. As a result, bicycle contacting face 48 has a high coefficient of friction with those portions of the bicycle being contacted by face 48 to resist slippage or relative movement of mount 20 relative to the bicycle and to reduce a noise during vibration. The rubber or elastic material forming the surface of bicycle contacting face 48 further resists scratching other damage to the bicycle to which mount 20 is secured. In other implementations, bicycle contacting face 48 may have other shapes and may be made from other materials.

Figure 2:
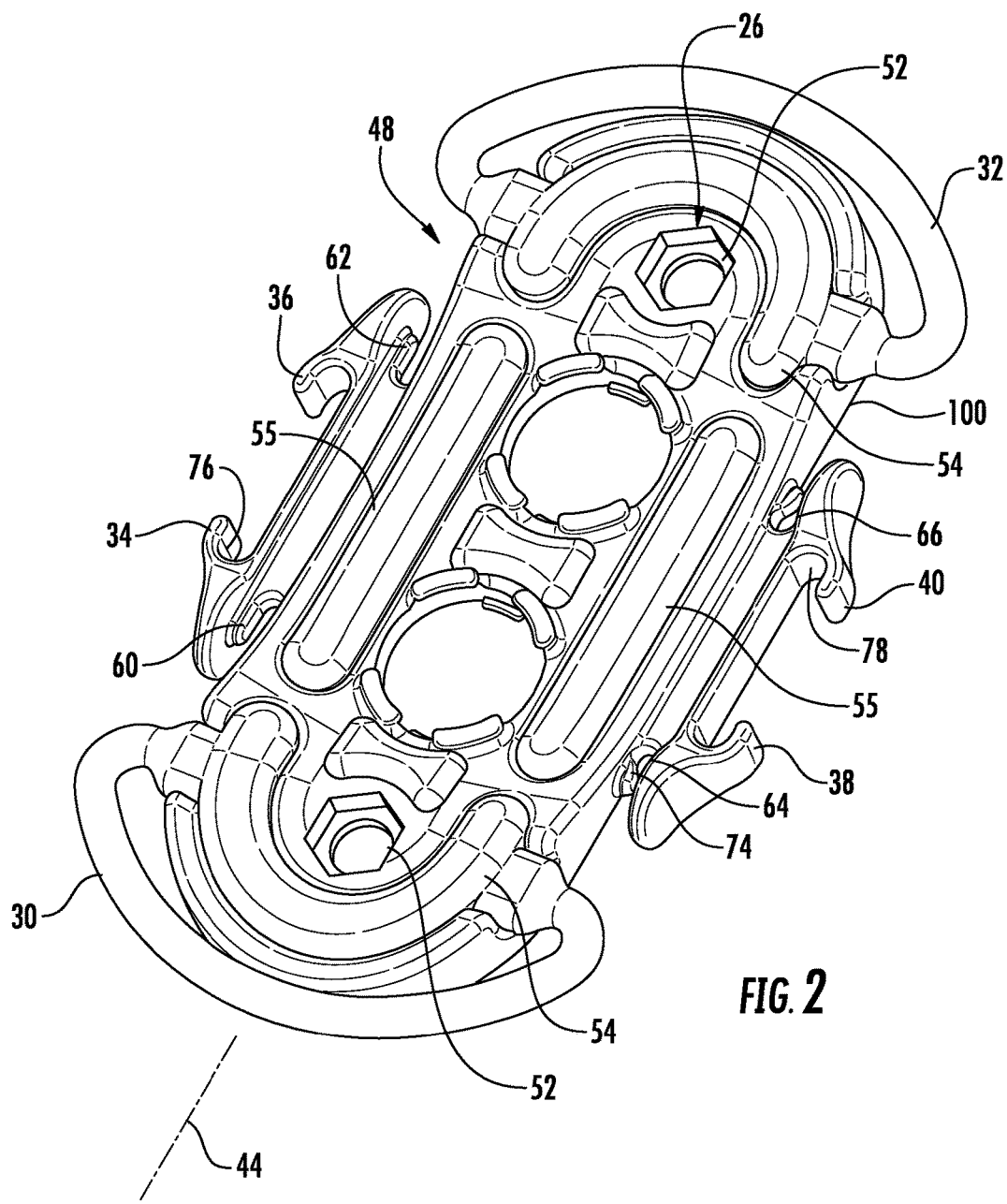
FIG. 2 is a bottom perspective view of the example article mount of FIG. 1.

As shown by FIG. 2, in the example illustrated, bicycle contacting face 48 of platform 24 comprises a plurality of spaced feet 54, 55. Feet 54, 55 provide services furthest away from article contacting face 46 and provide services against which a bicycle structure abuts or contacts. Feet 54, 55 provide soft and/or resiliently compressible or deformable surfaces that grip the structure the bicycle being contacted. Feet 54, 55 remaining portions of platform 24 away from mount 20, reducing contact of the bicycle with those portions of mount 20 that may be harder or not be formed from a rigid material, protecting such structures of the bicycle. In the example illustrated, feet 54 comprise curved feet on opposite axial ends of platform 24 having concave profiles that actually face one another. As discussed above in illustrated in FIG. 3, such feet 54 also have concave profiles facing in a direction perpendicular to axis 44. As a result, feet 54 inhibit both axial slippage and laterally or transversely image of platform 24 relative to the tube or other structure the bike to which mount 20 is secured. Feet 55 comprise elongate rubber or elastomeric feet extending along centerlines parallel to axis 44. Feet 55 inhibit sideways or lateral movement of platform 24 (a direction perpendicular to axis 44). In other implementations, one or both of feet 54, 55 may have other sizes, shapes and configurations or may be omitted. For example, in other implementations, bicycle contacting face 48 may comprise elongate semi cylindrical or curved surface, or a flat or planar surface, of a soft (foam) and/or resiliently compressible or deformable material that continuously extends along a majority of an axial length and a transverse width of the underside of platform 24.

Retainers 26, 28 comprise structures that facilitate mounting or securement of bicycle article mount 20 to a bicycle. Retainers 26, 28 facilitate securement of mount 20 to a bicycle and multiple different fashions, allowing mount 20 to be secured to different bicycles having different dimensions, different bicycles having different components or structures and different portions of the bicycle. Retainer 26 comprises a pair of spaced mounting holes 52 which extend completely through platform 24 to facilitate securement of mount 20 to an existing water bottle cage mount on a bicycle using existing water bottle cage fasteners or to a water bottle cage bracket with associated fasteners. In the example illustrated, each of the mounting holes 52 are spaced apart (centerline to centerline) by 2.5 inches (64 mm). In the example illustrated, each of the spaced mounting holes 52 is countersunk, having a cavity to receive the head of the fastener or not of the fastener at or below the article contacting face 46 of platform 24.

Retainer 28 comprises a mechanism that facilitates mounting or securement of mount 20 to a bicycle that may omit the water bottle cage mount or a bicycle that is already using the water bottle cage mount. Retainer 28 facilitates securement of mount 20 to various different portions of the bicycle or to various 56 differently sized structures of different bicycles. Retainer 28 comprises elastic line 56. Elastic line 56 comprise a line of elastic material, such as rubber or elastic polymer, that extend from the first side of platform 24 and which is releasably connectable to a second lateral side of platform 24, opposite the first side. In the example illustrated, elastic line 56 comprises an elastic loop having opposite end portions, both end portions being releasably connected to their respective lateral sides of platform 24. In the example illustrated, the elastic loop form by elastic line 56 is releasably hooked on each lateral side of platform 24.

As shown by FIGS. 1 and 2, retainer 28 additionally comprises hooks 60, 62, 64 and 66. Hooks 60 and 62 extend on a first lateral side 68 of platform 24 and cooperate to hook a first end portion of the elastic loop form by elastic line 56. Hooks 60 and 62 each have hook openings 70 that face away from one another in opposite axial directions. Hooks 64 and 66 extend on a second lateral side 72 of platform 24 and cooperate to a second end portion of the elastic loop form by elastic line 56. Hooks 64 and 66 each have hook openings 74 that face away from one another in opposite axial directions. Because retainer 28 utilizes pairs of oppositely facing hooks 60, 62 and 64, 66 along opposite sides of platform 24, such hooks may be substantially coplanar with the plane of platform 24, not projecting above or below platform 24 where such hooks might otherwise catch upon portions of the bicycle, catch upon portions of the article being held or be subject to impact and damage.

Because retainer 28 utilizes an elastic loop, when secured by hooks 60, 62, 64 and 66, two spaced segments or portions of the same loop contact, hold and grip the structure of the bicycle. The elastic loop provides to elastic loop comprise a low-cost standardized part that may be easily replaced when broken. Moreover, differently sized elastic loops (having different lengths) may be utilized to secure mount 20 to differently sized or differently shaped structures of a bike or of different bikes.

In other implementations, retainer 28 may have other configurations. For example, in other implementations, the elastic line 56 may alternatively comprise a single line having a looped portion at each end, wherein a first loop portion is received within hooks 60 and 62 and a second loop portion is received within hooks 64 and 66. In yet another implementation, the elastic line 56 may have two ends with a first end fixed to one lateral side of platform 24 and a second end hooked or otherwise releasably securable the other lateral side of platform 24. For example, one end of the elastic line may comprise a ball or head, wherein the line extends through a narrow slot or opening dimensioned smaller than the ball or head. In some implementations, mount 20 may omit one of retainers 26, 28. Although retainers 26 and 28 removably or releasably secured mount 20 to a carrier, such as a bicycle, in other implementations, mount 20 may alternatively be permanently fixed to the carrier bicycle, wherein retainers 26 and 28 may be omitted or have other configurations.

Elastic lines 30, 32 comprise lines of elastic material extending from platform 24 and configured to wrap about and hold an article against article supporting surface 46 of platform 24. In the example illustrated, each of elastic lines 30, 32 extends from platform 24 on each of lateral sides 68 and 72 of platform 24. Elastic lines 30 and 32 each form an endless loop on each axial end of platform 24. In the example illustrated, each of elastic lines 30 and 32 extend from platform 24 on opposite axial sides of hooks 60, 62, 64 and 66 and opposite axial sides of the endless loop form by elastic line 56 and releasably secured to platform 24 by hooks 60, 62, 64 and 66.

In one implementation, each of elastic lines 30 and 32 has a length extending from one lateral side of platform 24 to the other lateral side of platform 24 of at least 1 inch and nominally at least 2 inches. In one implementation, each of elastic lines 30 and 32 has an elasticity of between 300% to 400% elongation. In one implementation, each of elastic lines 30 and 32 are formed from a rubber compound such as ethylene propylene diene monomer (EPDM rubber). In other implementations, elastic lines 30 and 32 may be formed from other materials or compounds.

Hooks 34, 36, 38 and 40 extend from platform 24 on opposite lateral sides of platform 24. Hooks 34, 36, 38 and 40 cooperate with elastic lines 30 and 32 to (A) adjust the points at which straps 30 and 32 extend from platform 24 to provide a narrower spacing between such points and/or (B) reduce the effective length of each of straps 30 and 32 extending above platform 24 so as to grip smaller objects and/or increase the tension in lines 30 and 32 for greater holding force. In the example illustrated, hooks 34 and 36 extend on lateral side 68, facing one another with hooks 34, 36 having hook openings 76 facing one another in an axial direction. Similarly, hooks 38 and 40 extend on lateral side 70, facing one another with hooks 38 and 40 having hook openings 78 that face one another in an axial direction. In the example illustrated, hooks 34 and 36 are built upon are supported by hooks 60 and 62. Hooks 38 and 40 are built upon or supported by hooks 64 and 66. In other implementations, hooks 34, 36, 38 and 40 may extend from platform 24 independent of hooks 60, 62, 64 and 66.

In other implementations, such hooks may have different configurations. For example, in other implementations, in lieu of having a curved hook opening, each of hooks 34, 36, 38 and 40 may alternatively comprise a post extending in a direction perpendicular to axis 44 or oblique to axis 44, wherein elastic line 30 or elastic line 32 wraps partially around the post. In other implementations, in lieu of having a hook on each side of platform 24 dedicated to one of lines 30, 32, lines 30 and 32 may alternatively share a single hook on each lateral side of platform 24. For example, in other implementations, each side 68, 72 may include a hook comprising single post extending oblique or perpendicular to axis 44 or may include a hook comprising an upwardly or downwardly facing curved hook opening, wherein both of elastic lines 30, 32 may partially wrap about the same hook (whether a post, and upwardly facing or downwardly facing hook opening) on one or both sides of platform 24. In some implementations, all of such hooks 34, 36, 38 and 40 may be omitted or some of such hooks may be omitted.

Figure 5:
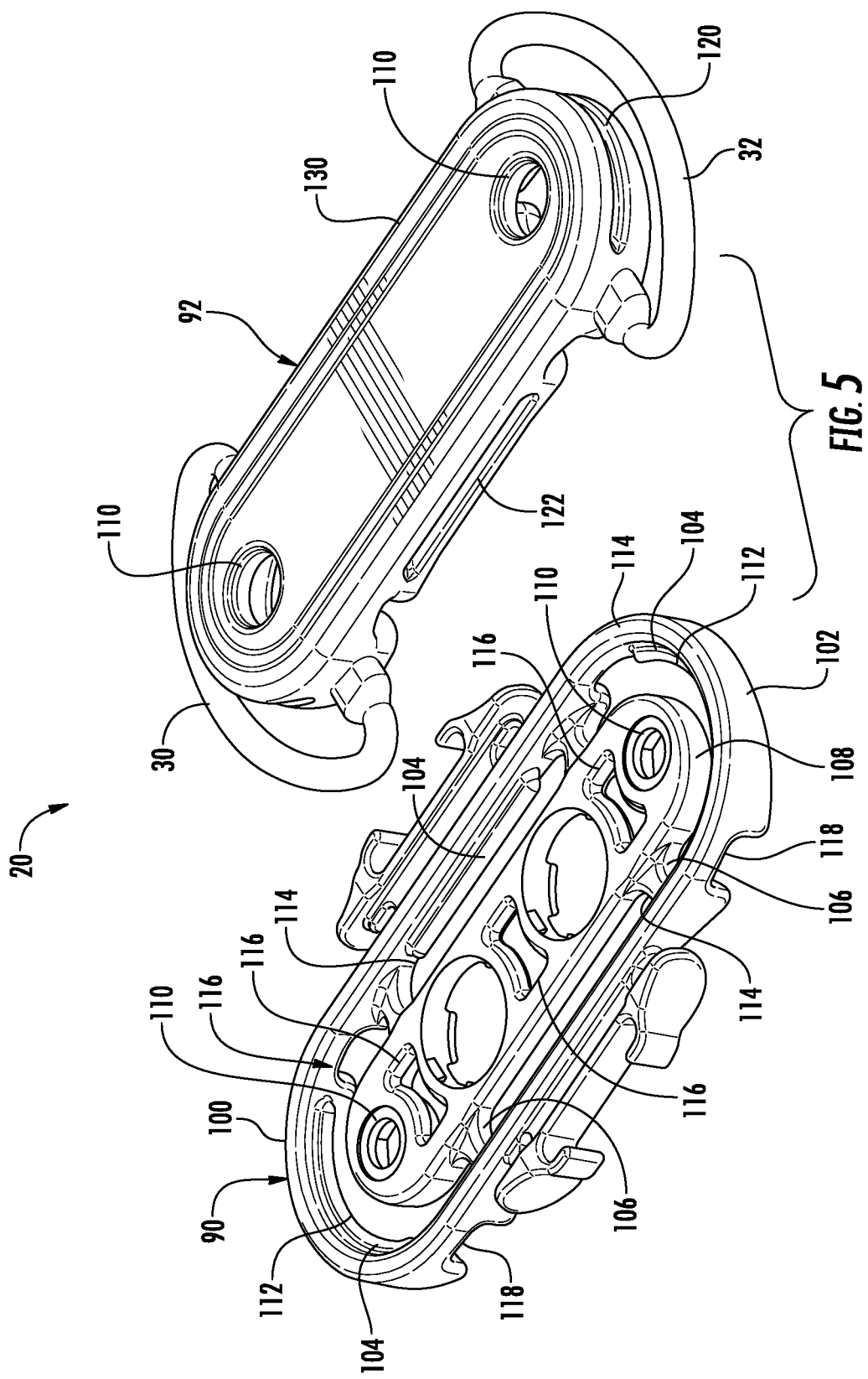
FIG. 5 is an exploded top perspective view of the example article mount.
Figure 6:
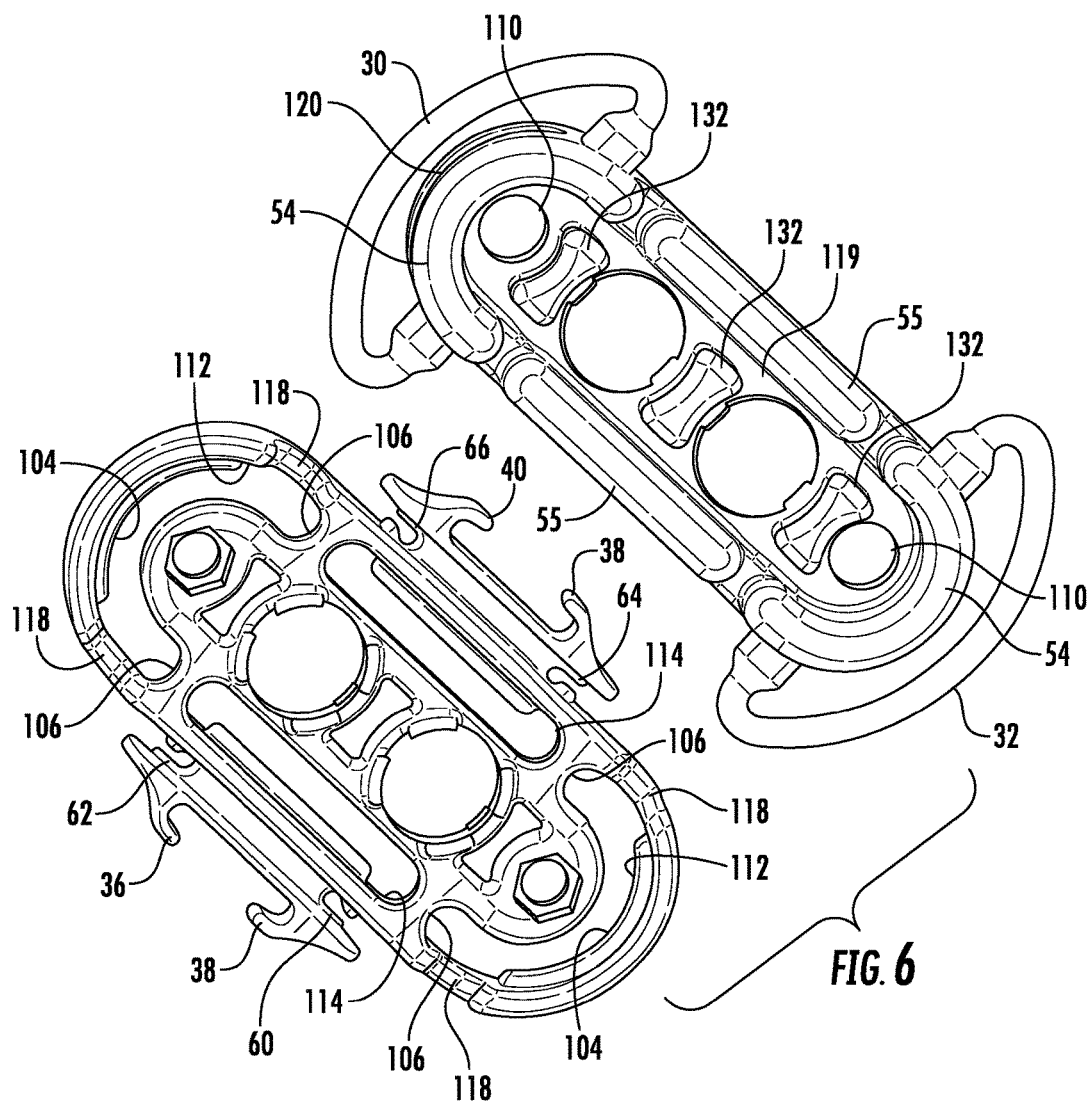
FIG. 6 is an exploded bottom perspective view of the example article mount.
Figure 7:
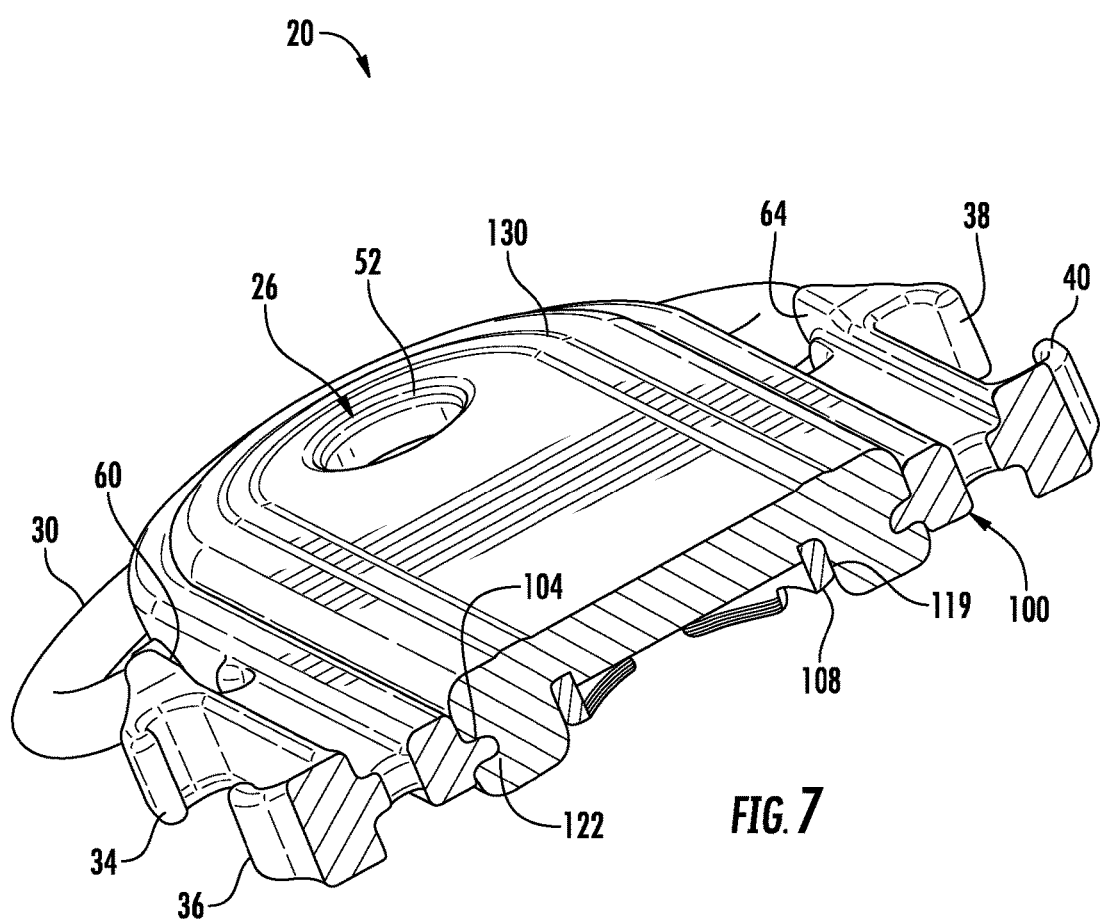
FIG. 7 is a transverse sectional view of the example article mount.
Figure 8:
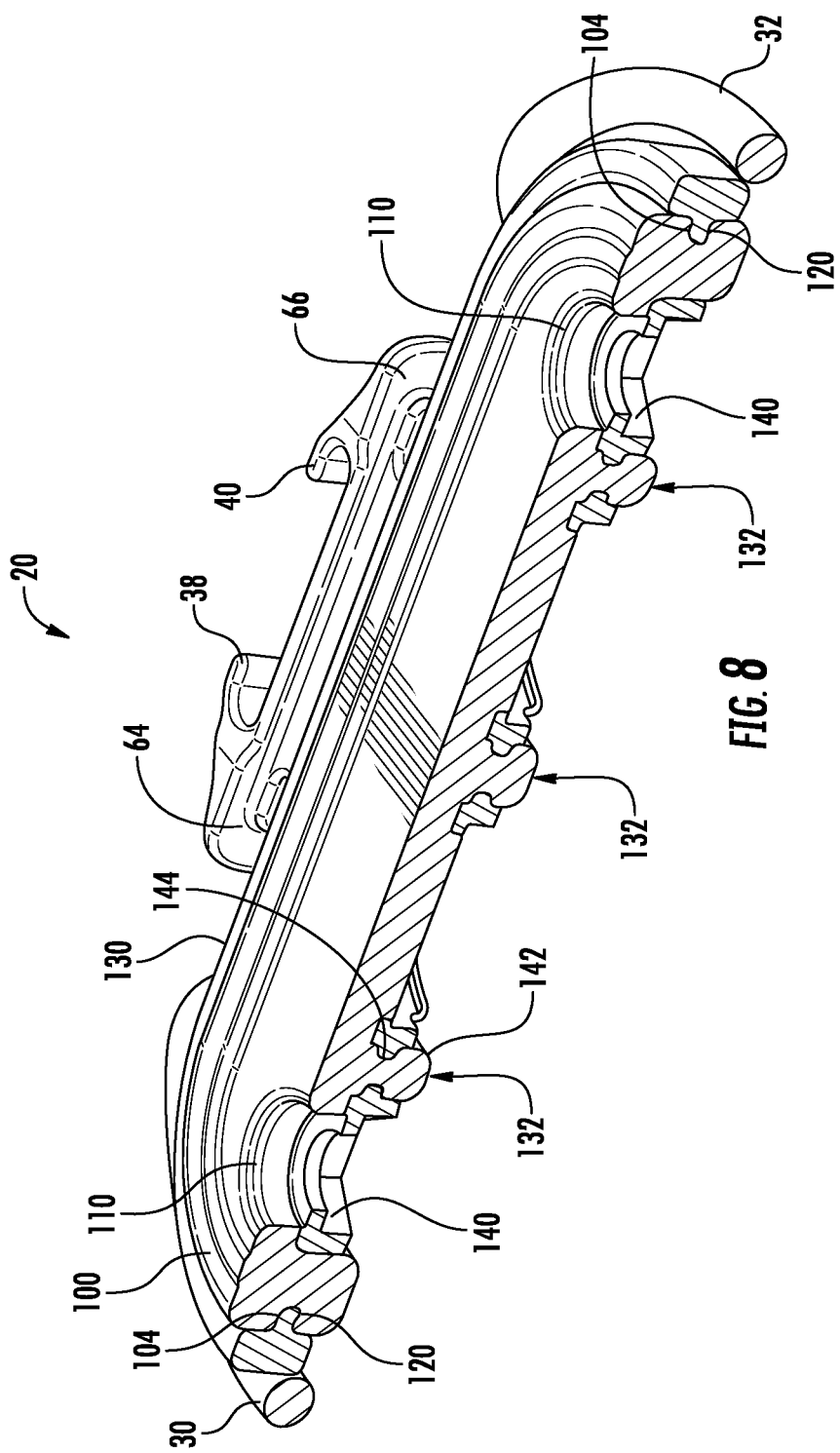
FIG. 8 longitudinal sectional view of the example article mount.

FIGS. 5-8 illustrate bicycle article mount 20 in further detail. FIG. 5 is a top exploded perspective view of mount 20. FIG. 6 is a bottom exploded perspective view of mount 20. FIG. 7 the first lateral or transverse sectional view of mount 20. FIG. 8 is a longitudinal or axial sectional view of mount 20. In the example illustrated, mount 20 comprises a two-piece mount, facilitating simplicity and low-cost manufacture. In the example illustrated, mount 20 comprises a first piece, base 90, and a second piece, top 92.

Base 90 comprises a single integral unitary body molded or otherwise formed from a polymer that forms spine 100 and each of hooks 34, 36, 38, 40, 60, 62, 64 and 66 (described above). In one implementation, the single integral unitary body of base 90 is formed from a material such as thermoplastic polycarbonate. In other implementations, base 90 may be formed from other materials having similar degrees of flexibility as polycarbonate, such as other rigid polymers.

Spine 100 comprises a single unitary structure serving as a backbone or base for platform 24. In the example illustrated, spine 100 comprises an outer ring or outer wall 102, top retaining projections 104, center island supports 106, island 108, a pair of mount retainer openings 110, feet openings 112, 114, pad securement openings 116 and elastic line openings 118. Outer wall 102 surrounds island 108 and forms an interior recess or cavity which partially receives top 92 and forms the sides of platform 24. Top retaining projections 104 comprise projections, shown his ribs, projecting inwardly from internal surfaces of the outer walls 102. Projections 104 are configured to be received within corresponding openings in top 92 to interlock spine 100 and top 92.

Center island supports 106 extend between outer walls 102 and island 108 to support island 108. Island 108 provides a structure that underlies top 92 and through which mount retainer openings 110 and pad securement openings 116 extend. Mount retainer openings 110 extend through island 108 and form part of openings 52 of retainer 26, described above.

Feet openings 112, 114 extend completely through spine 100, extending between island supports 106. Feet openings 112, 114 provide passages through which feet 54 and feet 55, respectively, extend. Pad securement openings 116 comprise openings extending through island 108 of spine 100 that receive projections of top 92 to locate and retain top 92 with respect to base 90. Elastic line openings 118 comprise openings in each corner of spine 100, through outer wall 102 and through which elastic lines 30 and 32 extend.

Top 92 comprises a single unitary body that forms feet 54, 55 and elastic lines 30, 32 described above. As shown by FIGS. 6-8, feet 54 and 55 form a recess 119 that receives island 108 of spine 100. Feet 54 and 55 further comprise slots, channels or apertures 120 and 122, respectively which receive top retaining projections 104 to further interlock top 92 to spine 100.

The single unitary body of top 92 further forms elastomeric pad 130 and pad retaining projections 132. In the example illustrated, the single unitary body comprises a single mass of material secured to spine 100 and extending at least partially over spine 100 to form pad 120, extending through feet openings 106, 108 to form feet 54, 55, extending through pad securement openings 110 to form pad retaining projections 122 and extending through elastic line openings 112 to form elastic lines 30, 32. In one implementation, the single mass of material comprise a mass of an elastic rubber-like material such as a rubber, a rubber compound an elastic polymer. In one implementation, the material possesses elastic properties described above respect to lines 30, 32. In one implementation, the mass of material comprises a material selected from a group of materials consisting of EPDM rubber (ethylene propylene diene monomer (M-class) rubber. In other implementations, other elastic materials may be utilized.

Pad 130 comprises a layer of the elastic material forming the article contacting surface 46 of platform 24 described above. Pad 130 comprises openings 140 which are aligned with openings 102 of spine 100 to form openings 52 described above. Pad retaining projections 132 projects through pad retaining openings 116 in island 108 of spine 100. As shown by FIG. 8, such pad retaining projections 132 each include a neck portion 142 and a larger head portion 144, wherein the neck portion 142 passes through a corresponding opening 116 and wherein the head portion 144 is larger than opening 1162 retain top 92 to spine 100.

In the example illustrated, the mass of elastic or elastomeric material forming top 92 is molded onto, about and through spine 100, which serves as a core. In other implementations, top 92 may be preformed and subsequently snapped onto or assembled to spine 100. Although mount 20 is illustrated as a two-piece construction, wherein the top soft elastomeric or compressible pad 130 is integrally formed as a single unitary body with elastic lines 30, 32, in other implementations, elastic lines 30, 32 may be integrally formed as a single unitary body (out of a first single mass of material) that is molded about, snapped, welded or bonded to spine 100 so as to form feet 54, 55, wherein a separate second mass of elastomeric, soft or compressible material is molded about, snapped, welded or bonded to spine 100 so as to form pad 130. In such an implementation, a first material or compound of multiple materials may be used to form elastic lines 30, 32 and feet 54, 55 while a second material or compound of multiple materials different than the first material or compound may be used to form pad 130. For example, the material chosen for lasting lines 30, 32 may offer greater stretchability and resiliency and greater gripping ability, the material chosen for pad 30 may be comparatively softer and more compressible. Although the two piece construction of mount 20 reduce manufacturing and assembly complexity and cost, in other implementations, mount 20 may comprise greater than two pieces, wherein the multiple pieces may be welded, fastened, bonded or otherwise joined together. In some implementations, different portions base 90 or different portions of top 92 may be formed from multiple different types of material. For example, elastic lines 30, 32 may be formed from a more elastic, stretchable material, whereas pad 130 may be formed from a more compressible and less stressful material, such as a foam. In one implementation, the different materials for the different portions of top 92 (or different portions of base 90) may be co-molded together. In some implementations, the ears extending from the opposite lateral sides of mount 20 that form hooks 34, 36, 38 and 40 as well as hooks 60, 62, 64, 66 may alternatively be formed as part of top 92, wherein top 92 would extend over sidewalls 102 of spine 100. In some implementations, such ears may themselves have internal rigid inserts or cores to provide additional stiffness.

Figure 9:
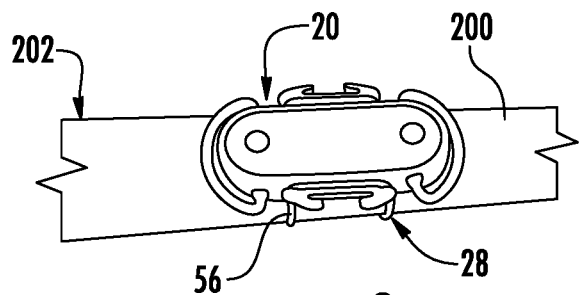
FIG. 9 is a perspective view illustrating the example article mount secured to a carrier, shown as a bicycle, using a first retainer.
Figure 10:
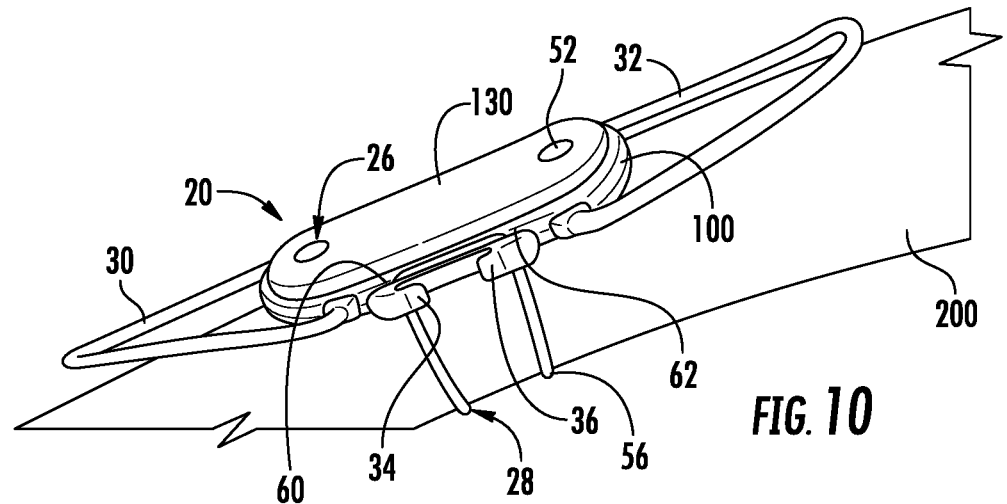
FIG. 10 is a perspective view illustrating the example article mount secured to the carrier using the first retainer.

FIGS. 9-12 illustrate various alternatives that mount 20 provides for securing mount 20 to a bicycle. FIGS. 9 and 10 illustrate mount 20 secured to the top tube 200 of a bicycle 202 using retainer 28. As shown by FIGS. 9 and 10, elastic line 56, in the form of an elastic loop or O-ring, is wrapped about hooks 60, 62 on one side of mount 20, extends around top tube 200 and is wrapped about hooks 64 and 66 on an opposite side of mount 20. Elastic line 56 stretches, as needed, to accommodate the shape and dimensions of top tube 200. Because elastic line 56 stretches to accommodate different sizes and shapes, retainer 28 may alternatively be mounted on other portions of a bicycle such as along the front of a seat tube or the sides or top of the downtube of the bicycle 200. FIG. 10 further illustrates elastic lines 30 and 32 being stretched to accommodate differently sized articles which are to be secured to bicycle 200.

Figure 11:
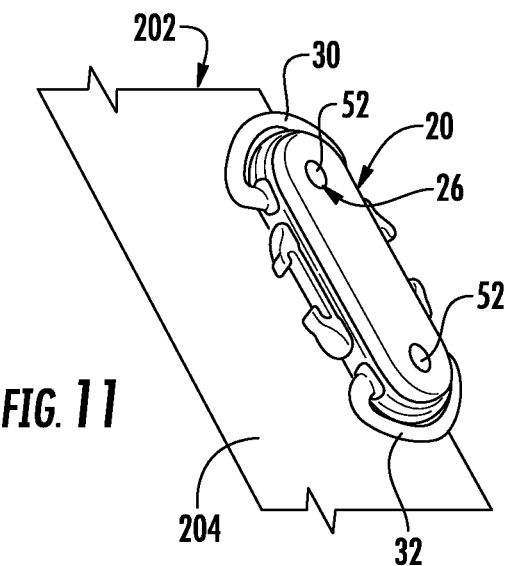
FIG. 11 is a perspective view illustrating the example article mount secured to the bicycle using a second retainer.

FIG. 11 illustrates mount 20 secured to the downtube 204 of bicycle 202 using an existing bottle cage mount of the bicycle 202. In particular, the two fasteners associated with the bottle cage mount 202 are unscrewed, passed through opening 52 of retainer 26 and re-screwed back into their corresponding threaded bores in downtube 204. The heads of the fasteners are received within the counter sinks provided by openings 110 in top 92.

Figure 12:
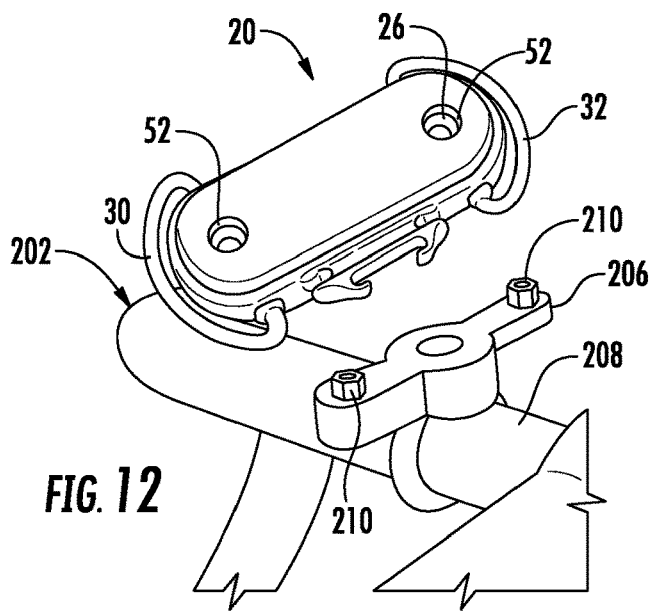
FIG. 12 is a perspective view illustrating another example use of the second retainer to secure the example article mount to the bicycle.

FIG. 12 illustrates an example water bottle mount bracket 206 secured to the handlebars 208 of bicycle 202. Retainer 26 facilitates securement of bracket 20 to bracket 206 and bicycle 202. In particular, the fasteners 210 of bracket 206 are unscrewed, passed through opening 52 of retainer 26 and re-screwed back into their corresponding threaded bores (or nut) associated with bracket 206. As should be appreciated, mount 20 may be secured bicycle 202 by retainer 26 in any place where bracket 206 may be mounted, such as the stem or other structures of the bicycle.

Although retainer 28 of mount 20 described as being utilized for securing mount 22 various parts of a bicycle, it should be appreciated that retainer 28 additionally facilitates securement of mount 20 to any of a variety of differently sized and shaped carriers, objects or structures that carry mount 20 and the articles secured by mount 20. For example, using retainer 28, mount 20 may be mounted or secured to and about the straps of a backpack, about a person's arm or leg, or about structures of other vehicles/carriers such as golf carts, strollers, motorcycles and/or all-terrain vehicles or utility task vehicles.

Figure 13:
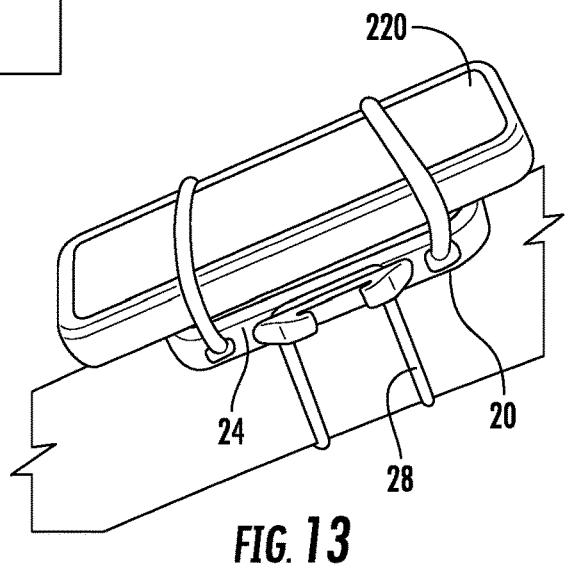
FIG. 13 is a perspective view illustrating the example article mount securing a first article to the bicycle.

Figures illustrate example uses of elastic lines 30, 32 to secure various differently shaped and configured articles against platform 24 which is secured to the example bicycle 202. FIG. 13 illustrates mount 20 secured to top tube 200 by retainer 28 with elastic lines 30, 32 wrapping about an example portable electronic device 220 so as to hold and retain the electronic device 220 against pad 24 of mount 20. In one implementation, portable electronic device 220 comprises a smart phone, a flash memory player, a personal data assistant or other handheld mobile device.

Figure 14:
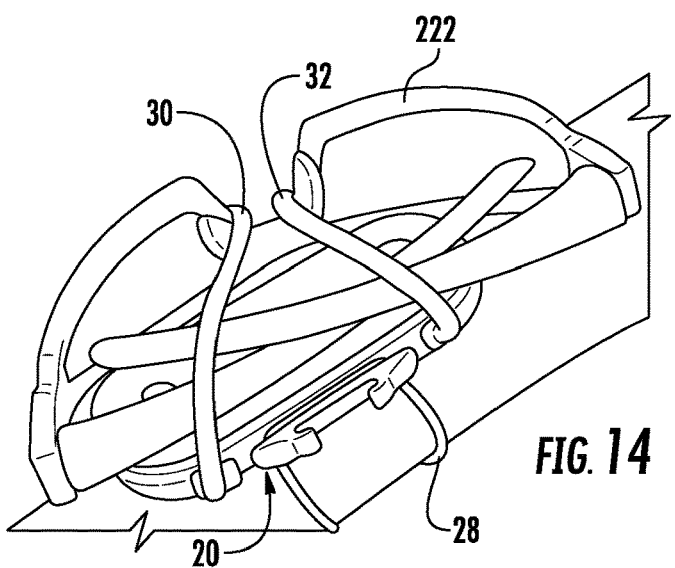
FIG. 14 is a perspective view illustrating the example article mount securing a second article to the bicycle.
Figure 15:
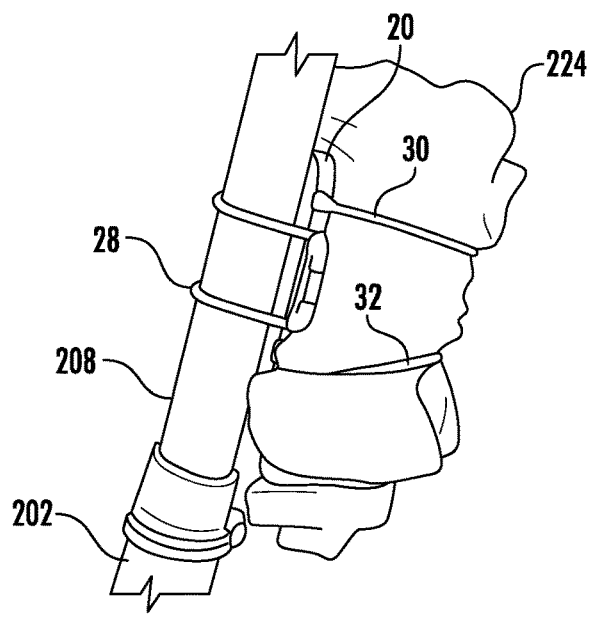
FIG. 15 is a perspective view illustrating the example article mount securing a third article to the bicycle.

FIG. 14 illustrates mount 20 secured to top tube 200 by retainer 28 with elastic lines 30, 32 wrapping about a pair of glasses 222, such as a pair of sunglasses. FIG. 15 illustrates mount 20 secured to the backside of a seatpost 208 of bike 202 with elastic lines 30, 32 wrapped about a rolled up fabric or textile article 224, such as a jacket, blanket, or rain poncho. As shown by FIGS. 14 and 15, the flexible and resiliently stretchable nature of elastic lines 30, 32 facilitate securement of a wide variety of differently shaped articles.

Figure 16:
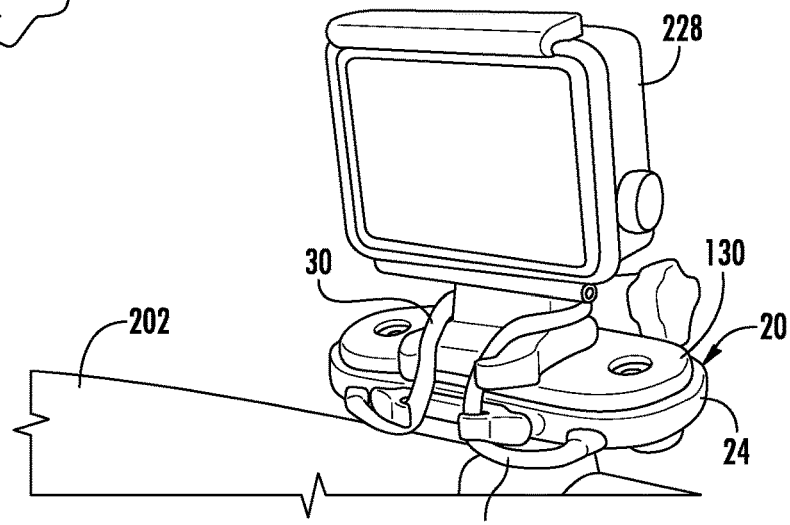
FIG. 16 is a perspective view illustrating the example article mount securing a fourth article to the bicycle.
Figure 17:
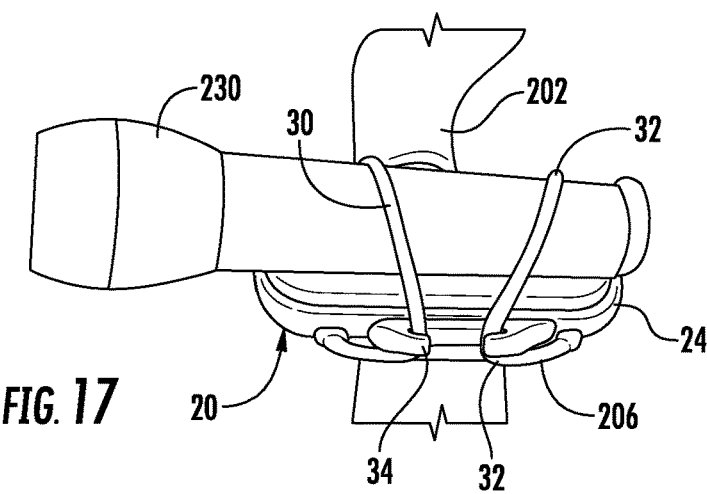
FIG. 17 is a perspective view illustrating the example article mount securing a fifth article to the bicycle.

FIGS. 16 and 17 illustrate the use of hooks 34, 36, 38 and 40 with elastic lines 30, 32 to secure articles that may require a greater amount of holding force or that may require a closer spacing of lines 30, 32 when secured against platform 24. FIG. 16 illustrates elastic lines 30, 32 first extending through hook opening 76 of hooks 34, 36, 38 and 40 on opposite sides of mount 20 prior to extending across pad 130 of platform 24. As a result, elastic lines 30, 32 are spaced more closely together when traversing pad 130 so as to engage the example article 224, shown as a video camera, or its mounting structure. In addition, hooks 34, 36, 38 and 40 and hold the portion of the length of lines 30, 32 to reduce the length of lines 30, 32, facilitating the use of lines 30, 32 to secure thinner articles or articles having a dimension less than the size of the loop formed by lines 30, 32. As shown by FIG. 17, hooks 34, 36, 38 and 40 receive lines 30, 32 to reduce the size of the loop formed by lines 30, 32 above platform 24 such that lines 30, 32 may securely wrap about an article 230 (shown as a flashlight) having a smaller diameter or smaller size while holding the smaller sized article 230 against platform 24.

Overall, bicycle article mount 20 provides a tough, lightweight and simple solution to attach virtually anything to a bicycle or other structure. Bicycle article mount 20 may be utilized to secure and hold a wide variety of articles such as smart phones, a light jacket, sunglasses, energy bars or a water bottle, keeping everything tightly attached to any bicycle. Using a two-part construction of a rigid frame and elastic bands made of rubber or elastic compounds, mount 20 stretches to keep all sorts of shapes and sizes snugly fit against the bicycle frame. Mount 20 provides easy tool free attachment through the use of 2 different sized elastic loops (elastic line 56), which allows the mount 20 to fit on almost any frame or even using the water bottle cage mounts on the bicycle.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements.

What is claimed is:

1. An article mount for securing articles, the article mount comprising:
   a platform having an axial length and an article contacting face;
   a retainer to releasably secure the platform to a carrier;
   an elastic line extending from the platform; and
   a hook extending from the platform to receive the elastic line to capture at least one article between the elastic line and the article contacting face, wherein the platform comprises:
   a spine integrally formed as a single unitary body with the hook, a second hook, a third hook and a fourth hook; and
   a mass of an elastomeric material extending on the spine to form an elastomeric pad providing, extending through the spine to form the article contacting face of the platform, extending through the spine to form a bicycle contacting face of the platform and extending from the spine to form the elastic line.

2. The article mount of claim 1, wherein the retainer comprises a second elastic line extending from a first lateral side of the platform and releasably connectable to a second lateral side of the platform, opposite the first lateral side.

3. The article mount of claim 2, wherein the second hook is on the second lateral side of the platform, the second hook to releasably receive the second elastic line.

4. The article mount of claim 3, wherein the third hook is on the second lateral side of the platform, wherein the second elastic line comprises an elastic loop having a first end to be hooked to the second hook and a second end to be hooked to the third hook.

5. The article mount of claim 1, wherein the hook is supported by the second hook with the second hook being sandwiched between the hook and the platform.

6. The article mount of claim 1, wherein the hook and the fourth hook have hook openings that face one another.

7. The article mount of claim 1, wherein the elastic line comprises a first portion extending from a first lateral side of the platform and a second portion extending from a second lateral side of the platform opposite the first lateral side.

8. The article mount of claim 7, wherein the first portion and the second portion of the elastic line are fixed to the platform.

9. The article mount of claim 7 further comprising a third elastic line having a first portion extending from the first lateral side of the platform and a second portion extending from the second lateral side of the platform opposite the first lateral side, the third elastic line extending from the platform on a first axial end of the platform, wherein the elastic line extends from the platform on a second axial end of the platform with the hook being located axially between the elastic line and the third elastic line.

10. The article mount of claim 9, wherein the single mass of elastomeric material forms each of the elastic line and the third elastic line.

11. The article mount of claim 2 further comprising a second retainer, wherein the second retainer comprises a pair of spaced mounting holes extending through the platform, the pair of spaced mounting holes being spaced apart by 2.5 inches (64 mm).

12. The article mount of claim 1, wherein the mass of elastomeric material further forms a second elastic line, wherein the elastic line extends from the spine on a first axial end of the spine and wherein the second elastic line extends from the spine on a second axial end of the spine, opposite the first axial end.

13. The article mount of claim, a third hook and a fourth hook, wherein the hook and the second hook are on a first lateral side of the spine and are axially between the elastic line and the second elastic line, the hook and the second hook having hook openings that face one another, and wherein the third hook and the fourth hook are on a second lateral side of the spine and are axially between the elastic line and the second axial line, the third hook and the fourth hook having hook openings that face one another.

14. The article mount of claim 1, wherein
   the first hook and the second hook are located on a first side of the platform;
   wherein the third hook and the fourth hook are located on a second side of the platform opposite the first side;
   a first elastomeric loop formed by the elastic line on a first axial end of the platform; and
   a second elastomeric loop on a second axial end of the platform, wherein the first elastomeric loop is selectively engageable with the hook and the third hook and wherein the second elastomeric loop is selectively engageable with the second hook and the fourth hook.

15. An article mount for securing articles to a bicycle, the article mount comprising:
   a platform having an axial length and comprising:
   a spine;
   a mass of elastomeric material extending at least partially over the spine to form an elastomeric pad provided article contacting face of the platform, extending through the spine to form a bicycle contacting face of the platform and extending from the spine to form at least one elastomeric loop for surrounding an article and resiliently retaining the article against the article contacting face of the platform.

16. An article mount for securing articles, the article mount comprising:
   a platform having an axial length and an article contacting face;
   a retainer to releasably secure the platform to a carrier;
   an elastic line extending from the platform; and
   a hook extending from the platform to receive the elastic line to capture at least one article between the elastic line and the article contacting face, wherein the retainer comprises a second elastic line extending from a first lateral side of the platform and releasably connectable to a second lateral side of the platform, opposite the first lateral side, wherein the retainer comprises at least one second hook on the second lateral side of the platform, the at least one second hook to releasably receive the second elastic line, wherein the at least one second hook comprises a first hook opening facing in a first axial direction and a second hook opening facing in a second axial direction opposite the first axial direction and wherein the hook is supported by the at least one second hook with the at least one second hook being sandwiched between the hook and the platform.

17. The article mount of claim 16 further comprising a fourth hook supported by the at least one second hook with the at least one second hook being sandwiched between the fourth hook and the platform.

18. The article mount of claim 17, wherein the hook and the fourth hook have hook openings that face one another.

19. The article mount of claim 18, wherein the elastic line comprises a first portion extending from a first lateral side of the platform and a second portion extending from a second lateral side of the platform opposite the first lateral side.

20. The article mount of claim 19, wherein the first portion and the second portion of the elastic line are fixed to the platform.

* * * * *